United States Patent
Riesberg et al.

(10) Patent No.: US 7,437,216 B2
(45) Date of Patent: Oct. 14, 2008

(54) METHOD FOR CONTROLLING A WIND ENERGY TURBINE OF A WIND PARK COMPRISING MULTIPLE WIND ENERGY TURBINES

(75) Inventors: Andre Riesberg, Wallenhorst (DE); Florian Krug, Munich (DE); Christian Schram, Munich (DE); Christian Eisenhut, Kanton Appenzell (CH)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/536,295

(22) Filed: Sep. 28, 2006

(65) Prior Publication Data

US 2007/0078567 A1 Apr. 5, 2007

(30) Foreign Application Priority Data

Sep. 30, 2005 (EP) .................................. 05109121

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *F03D 9/00* | (2006.01) |
| *H02P 9/04* | (2006.01) |

(52) U.S. Cl. .................... 700/286; 700/291; 290/44; 290/55

(58) Field of Classification Search .............. 700/286, 700/291; 290/44, 55
See application file for complete search history.

(56) References Cited

U.S. PATENT DOCUMENTS

| | | | |
|---|---|---|---|
| 6,219,623 B1 * | 4/2001 | Wills ............................ 702/60 |
| 6,479,907 B1 | 11/2002 | Eriksson et al. | |
| 6,512,966 B2 * | 1/2003 | Lof et al. ..................... 700/291 |
| 6,724,097 B1 * | 4/2004 | Wobben ....................... 290/44 |
| 7,025,567 B2 * | 4/2006 | Wobben ........................ 416/1 |
| 7,182,575 B2 * | 2/2007 | Grabau .......................... 416/1 |
| 7,253,537 B2 * | 8/2007 | Weng et al. ................... 290/44 |
| 7,298,059 B2 * | 11/2007 | Delmerico et al. ............ 307/85 |
| 7,372,173 B2 * | 5/2008 | Lutze et al. ................... 290/44 |
| 2004/0207206 A1 * | 10/2004 | Wobben ....................... 290/44 |
| 2004/0258521 A1 | 12/2004 | Wobben | |
| 2006/0142899 A1 * | 6/2006 | Wobben ..................... 700/286 |
| 2007/0018457 A1 * | 1/2007 | Llorente Gonzalez ........ 290/44 |
| 2007/0035136 A1 * | 2/2007 | Janssen ....................... 290/44 |
| 2007/0067067 A1 * | 3/2007 | Stommel .................... 700/287 |
| 2007/0108769 A1 * | 5/2007 | Wobben ....................... 290/44 |
| 2007/0299548 A1 * | 12/2007 | Weitkamp .................... 700/52 |
| 2008/0073912 A1 * | 3/2008 | Fortmann et al. ............. 290/44 |

FOREIGN PATENT DOCUMENTS

| | | |
|---|---|---|
| EP | 1571746 A | 9/2005 |
| WO | WO 03/030329 A | 4/2003 |
| WO | WO 2004/099604 A | 11/2004 |

* cited by examiner

*Primary Examiner*—Ronald D Hartman, Jr.
(74) *Attorney, Agent, or Firm*—GE Global Patent Operation

(57) ABSTRACT

The method for controlling a first wind energy turbine of a wind park comprising multiple wind energy turbines connected to the grid, in situations where the first energy turbine operates substantially at zero energy output level, comprises the steps of determining whether at least one of the other wind energy turbines of the wind park is operated above a predetermined energy output level, and if at least one of the other wind energy turbines of the wind park is operated above the predetermined energy output level, maintaining connection of the first wind energy turbine to the grid.

7 Claims, No Drawings

METHOD FOR CONTROLLING A WIND ENERGY TURBINE OF A WIND PARK COMPRISING MULTIPLE WIND ENERGY TURBINES

BACKGROUND OF THE INVENTION

1. Field of the Invention

The present invention relates to a method for controlling a wind energy turbine of a wind park comprising multiple wind energy turbines and, in particular, an optimized wind farm management with autonomous wind turbine control.

2. Related Prior Art

Wind turbines operating at lull wind conditions are exposed either to frequent switching operations or to higher energy consumptions due to the control of the wind energy turbine performed to the effect of keeping the turbine online and in rotation (motor operating mode). The reason for this behaviour is the aim of the turbine control system to gain as much energy from the wind as possible. The switches by which the generator of a wind energy turbine is connected and disconnected from the grid have a limited lifetime due to mechanical wear. At lull wind conditions, switching on and off the grid occurs more often and energy consumption will increase. Depending on wind speed characteristics, turbulences, controller structure, and parameter settings, the amount of switching operations per year varies considerably between different locations. If wind speed is often at cut-in and cut-out range, a high switching number will occur. Accordingly, maintenance and replacement of the switches have to be done after a certain switching number. Due to site-specific climate effects and turbulence intensities, the maintenance intervals can be rather small. In particular in off-shore applications, higher numbers of switching operations become economically questionable due to higher performance and replacement costs.

SUMMARY OF THE INVENTION

It is an object of the present invention to provide a method for controlling a wind energy turbine of a wind park comprising multiple wind energy turbines, wherein the switching cycles can be reduced if the wind energy turbine to be controlled operates substantially at zero energy output level as e. g. in lull wind conditions.

In order to achieve the above object, the present invention provides for a method for controlling a first wind energy turbine of a wind park comprising multiple wind energy turbines connected to the grid, in situations where the first wind energy turbine operates substantially at zero energy output level, wherein the method comprises the steps of determining whether at least one of the other wind energy turbines of the wind park is operated above a predetermined energy output level, and if at least one of the other wind energy turbines of the wind park is operated above the predetermined energy output level, maintaining the connection of the first wind energy turbine to the grid.

DETAILED DESCRIPTION OF THE PREFERRED EMBODIMENTS

According to the invention, a wind energy turbine of a wind park is not automatically switched off if the wind energy turbine operates substantially at zero energy output level. Prior to switching off the wind energy turbine, it is first determined whether at least one of the other wind energy turbines of the wind park is operated above a predetermined energy output level. By means of this feature it is determined whether the whole wind park is operated at substantial zero energy output level or whether in an extreme situation it is merely the respective wind energy turbine which currently is operated substantially at zero energy output level. Accordingly, the other wind energy turbines of the wind part are used as sensors or detectors for detecting the current operating state of the wind park. If at least one of the other wind energy turbines of the wind park is operating above the predetermined energy output level, the wind energy turbine to be controlled is maintained connected to the grid i. e. is not automatically switched off for at least a predetermined time.

One aspect of the present invention is to deviate from optimal power curve settings for converting also small gusts at low wind speeds into rotational energy and, therefore allow the turbine to bridge longer negative gusts. Maintaining the wind energy turbine connected to the grid during e. g. a lull wind condition also means that this wind energy turbine is directly ready for producing electrical energy as soon as wind speed increases again. Accordingly, no time has to be spent for first switching on and running up the wind energy turbine.

Another aspect of the present invention is to supervise the turbine behaviour in close to zero power operation states and to make estimations on the upcoming wind condition to decide whether or not a reconnection to the grid is useful. Additionally, not only the turbine-integrated wind speed sensors can be used to decide whether a grid connection/disconnection should be performed but also the determined and observed turbine behaviour of neighbouring turbines in a wind park. For instance, if the wind energy turbine to be controlled is in the wake of another turbine, which in turn is operating at around zero energy output level, it can be useful to not connect the wind energy turbine located in the wake to the grid until the other turbine reaches a predetermined energy output level.

Accordingly, the idea of the present invention is to optimize the turbine behaviour at around zero energy output level conditions and, in particular, at lull wind conditions. By means of the invention the amount of switching cycles can be minimized. The optimization according to the invention is performed by means of individual controller settings of each of the wind energy turbines which will optimize energy production and switching cycles.

By means of the present invention an optimized operation and control of wind energy turbines below rated wind speeds are possible. Each turbine of a wind park uses the surrounding turbines, all turbines or the whole wind park as additional sensors. This allows to optimize the wind park operation based on the principles of cellular automat, self-organized systems, and distributed intelligence. Other aspects of the present invention relate to icing detection and load optimization within a wind park.

According to another embodiment of the present invention, the wind energy turbine to be controlled is disconnected from the grid if the majority of the wind energy turbines of the wind park operates substantially at zero energy level. As an alternative, if e. g. a group of wind energy turbines of the wind park spaced from the wind energy turbine to be controlled, operates above a predetermined energy output level, this could be a hint for an inhomogeneous current wind profile. In such a condition it would make sense to keep the wind energy turbine to be controlled connected to the grid since a homogeneous wind profile can be expected soon or, in other words, wind profile inhomogeneities will not last long.

On the other hand, if the wind energy turbine to be controlled is located within a group of wind energy turbines operating above a predetermined energy output level, this is an indication that the wind energy turbine to be controlled and currently operating substantially at zero energy output level has a certain defect, i. e. icing or other impairments or damages.

In another embodiment of the present invention the wind energy turbine to be controlled and operating substantially at zero energy output level is switched off if the current wind is blowing in a predetermined wind direction area so that results of the wind energy turbine to be controlled is located due to the topology of the surrounding area of the wind park in a wake. Accordingly, as mentioned above, if the wind energy turbine to be controlled is located in a wake of another wind energy turbine or of an obstacle (forest, building, hill or the like), maintaining connection of the respective wind energy turbine to the grid is not useful as long as the wind direction does not change.

The invention shows a new manner how to provide power generation and switching cycle reductions at e. g. low wind speeds. Energy to be provided to the grid is relevant. Due to that, according to the invention, the individual turbines of a wind park can be operated or switched on and off at different cut-in or cut-out wind speeds.

It is already known to collectively control all wind energy turbines in a wind park. However, the invention is clearly different from that known approach in that the invention relates to the control of individual turbines by individual controllers with individual parameter settings wherein all the turbines are connected to each other at their sensor levels in order to control each turbine individually depending on the behaviour of at least some of the other turbines of the wind park. The advantages of the invention are maximization of total power generation and failure effect decrease as compared to central wind farm managements.

Moreover, the invention can be used for optimizing control structures and parameter settings in the cut-in and cut-out areas of wind energy turbines. As wind conditions in different sites differ significantly from each other, also the turbine control behaviour will differ from good to bad, depending under what conditions the turbine is currently operated. Therefore, the present invention is also aimed at a self-learning controller concept adapted to optimize turbine behaviours according to local wind conditions.

The invention claimed is:

1. A method for controlling operation of a wind park comprising a first wind energy turbine and other wind energy turbines, the first wind energy turbine being connected to a power grid by a switch, in a situation where the first wind energy turbine operates substantially at zero energy output level, the method comprising the steps of:

determining whether at least one of the other wind energy turbines operates above a predetermined energy output level; and if at least one of the other wind energy turbines operates above the predetermined energy output level, maintaining the connection of the first wind energy turbine to the power grid so that switching cycles of the switch are reduced.

2. The method of claim 1, wherein the at least one of the other wind energy turbines comprises at least two of the other wind energy turbines which are not adjacent to the first wind energy turbine.

3. A method for controlling operation of a wind park comprising a first wind energy turbine and other wind energy turbines each connected to a power grid, the first wind energy turbine being in wake when wind blows in a predetermined wind direction range, in a situation where the first wind energy turbine operates substantially at zero energy output level, the method comprising the steps of:

determining a current wind direction at the wind park; and if the determined current wind direction is within the predetermined wind direction range, disconnecting the first wind energy turbine from the power grid.

4. The method of claim 3, wherein the first wind energy turbine is in wake when wind blows in the predetermined wind direction because of a topology of a surrounding area of the wind park.

5. The method of claim 3, wherein the first wind energy turbine is in wake when wind blows in the predetermined wind direction because of one of the other wind energy turbines.

6. The method of claim 3, if the first wind energy turbine is disconnected from the power grind, the method further comprising the steps of:

determining a current wind direction at the wind park again; and if the newly determined current wind direction is outside the predetermined wind direction range, connecting the first wind energy turbine to the power grid after at least one of the other wind energy turbines operates above a predetermined energy output level.

7. A method for controlling operation of a wind park comprising a first wind energy turbine and other wind energy turbines each connected to a power grid, the other wind energy turbines surrounding the first wind energy turbine, in a situation where the first wind energy turbine operates substantially at zero energy output level, the method comprising the steps of:

determining whether each of the other wind energy turbines operates above a predetermined energy output level; and if each of the other wind energy turbines operates above a predetermined energy output level, disconnecting the first wind energy turbine from the power grid.

* * * * *